United States Patent [19]

George et al.

[11] 4,205,278

[45] May 27, 1980

[54] MULTIPLE EXCITATION REGENERATIVE AMPLIFIER INERTIAL CONFINEMENT SYSTEM

[75] Inventors: Victor E. George, Livermore; Roger A. Haas; William F. Krupke, both of Pleasanton; Leland G. Schlitt, Livermore, all of Calif.

[73] Assignee: The United States of America as represented by the United States Department of Energy, Washington, D.C.

[21] Appl. No.: 868,639

[22] Filed: Jan. 11, 1978

[51] Int. Cl.$^2$ .......................................... H01S 3/091
[52] U.S. Cl. ........................... 331/94.5 P; 331/94.5 G
[58] Field of Search ...................... 331/94.5 P, 94.5 G; 330/4.3

[56] References Cited

U.S. PATENT DOCUMENTS

| | | | |
|---|---|---|---|
| 3,235,813 | 2/1966 | Kogelnik et al. | 330/4.3 |
| 3,243,724 | 3/1966 | Vuylsteke | 331/94.5 Q |
| 3,389,348 | 6/1968 | DeMaria | 331/94.5 C |
| 3,414,835 | 12/1968 | Miller | 331/94.5 C |
| 3,597,695 | 8/1971 | Swain et al. | 330/4.3 |
| 3,646,469 | 2/1972 | Buczek et al. | 331/94.5 C |
| 3,668,536 | 6/1972 | Michon | 331/94.5 C |
| 3,723,246 | 3/1973 | Lubin | 176/1 |
| 3,820,037 | 6/1974 | Corcoran | 331/94.5 C |
| 3,879,109 | 4/1975 | Thomas | 350/169 |
| 3,944,947 | 3/1976 | Pike et al. | 330/4.3 |
| 4,061,985 | 12/1977 | Siebert | 331/94.5 C |

OTHER PUBLICATIONS

Belanger et al., Gigawatt Peak-Power Pulse Generation by Injection of a Single Short Pulse in a Regenerative Amplifier Above Threshold, Canadian J. of Phys., vol. 54, No. 6 (Mar. 15, 1976), pp. 720–727.
Hunt et al., The Use of Multiple Spatial Filters as a Relay Line in Laser Fusion Systems, Lawrence Livermore Laboratory Report UCRL-78653 (Sep. 1976).
Thorne et al., Intensity Filtration of Laser Light, Appl. Phys., vol. 45, No. 7, (Jul. 1974), pp. 3072–3078.
Harrach et al., Laser Beam Filtering by Saturable Dyes, Lawrence Livermore Laboratory Report UCRL-51008 (Apr. 1971).
Glaze, High Energy Glass Lasers, Optical Engineering, vol. 15, No. 2, (Mar.-Apr. 1976), pp. 136–142.
Lewkowicz, Spherical Hydrogen Targets for Laser-Produced Fusion, J. of Physics D:Applied Phys. vol. 7, (1974).
Fowler et al., A Survey of Laser Beam Deflection Techniques, Proc. IEEE, vol. 54 (Oct. 1966), pp. 1437–1444.

Primary Examiner—William L. Sikes
Attorney, Agent, or Firm—R. V. Lupo; Roger S. Gaither; P. Martin Simpson, Jr.

[57] ABSTRACT

The invention relates to apparatus and methods for producing high intensity laser radiation generation which is achieved through an optical amplifier-storage ring design. One or two synchronized, counterpropagating laser pulses are injected into a regenerative amplifier cavity and amplified by gain media which are pumped repetitively by electrical or optical means. The gain media excitation pulses are tailored to efficiently amplify the laser pulses during each transit. After the laser pulses have been amplified to the desired intensity level, they are either switched out of the cavity by some switch means, as for example an electro-optical device, for any well known laser end uses, or a target means may be injected into the regenerative amplifier cavity in such a way as to intercept simultaneously the counterpropagating laser pulses. One such well known end uses to which this invention is intended is for production of high density and temperature plasmas suitable for generating neutrons, ions and x-rays and for studying matter heated by high intensity laser radiation.

11 Claims, 11 Drawing Figures

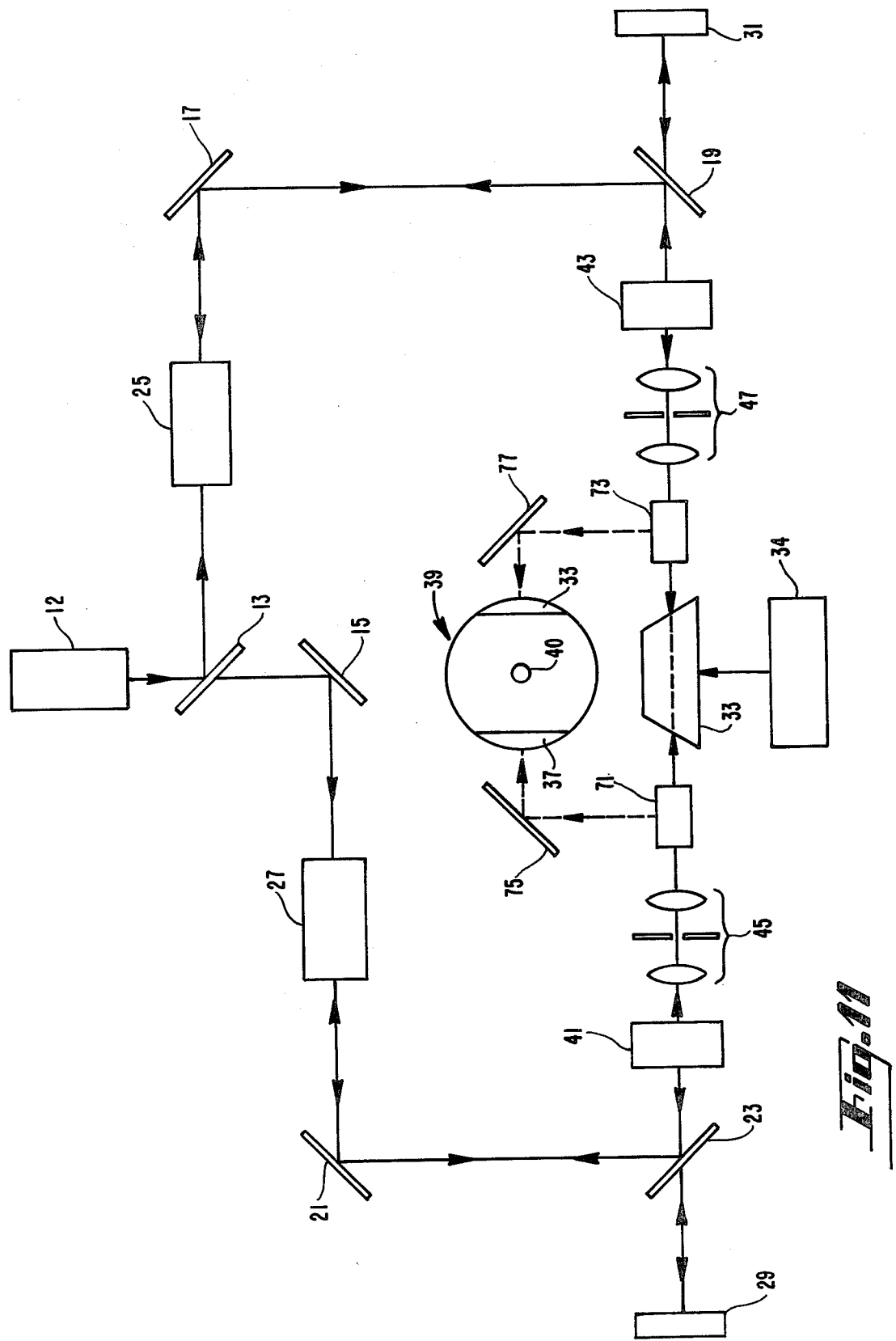

MULTIPLE EXCITATION REGENERATIVE AMPLIFIER INERTIAL CONFINEMENT SYSTEM

BACKGROUND OF THE INVENTION

The invention described herein arose at the University of California Lawrence Livermore Laboratory in the course of, or under Contract W-7405-ENG-48 with the United States Department of Energy (formerly USERDA).

In the field of laser technology there exists a need for high power laser systems. Such high power lasers have many well known areas of application if only the economic hurdles could be overcome. One such well known use will be elaborated on herein in an effort to more completely describe the invention, but this it not intended as the only use of the invention.

In the field of magnetic and inertial confinement fusion, a need exists for high density and temperature plasmas. Such plasmas are useful in providing an environment for the controlled release of energy in thermonuclear reactions, as well as for research on the properties of plasmas and their interaction with electric and magnetic fields and high intensity laser radiation.

In the prior art, plasmas have been generated by many different techniques, each possessing weaknesses which limit its applicability and/or the density, temperature and lifetime of the resulting plasma. For example, in the field of laser initiated inertial confinement fusion, experimental results and theoretical calculations currently indicate that a laser producing 200-300 TW and 200-300 KJ will be required to achieve high gain microexplosions and demonstrate the feasibility of net energy gain from a laser initiated fusion process. Present approaches to high power laser systems for neutron, x-ray and plasma production use master oscillator-driven long chains of laser amplifiers having many repeated optical elements to produce the desired pulses of high intensity laser radiation. The amplifier media employed may be coherently or incoherently photon pumped solid state laser media, such as Neodymium, Erbium, Thulium or other rare earth dopants in a glass or suitable solid matrix such as $CaF_2$. The media may also be photolytic gases such as $O_2$, $CO_2$, $N_2O$, $OCS$, $OCSe$ or Iodine. Alternatively, mixtures of gases such as (Ar or Ne)/$Kr/F_2$, (Ar or Ne)/$Xe/F_2$, or He/$N_2$/$CO_2$ maintained at a pressure on the order of one atmosphere, and excited by a high energy electron beam or an electric discharge may be employed. Irrespective of the amplification medium and excitation technique selected, the final amplification stage in the chain will account for perhaps 20-30% of the total cost of the system including the initial pulse generator or master oscillator.

U.S. Pat. No. 3,723,246 to Lubin teaches and claims plasma production apparatus including a target production device and an electromagnetic devide for moving each target into the target chamber while controlling target position. A "tailored" laser prepulse of duration 2-3 nanoseconds and a "tailored" main pulse of duration 0.1 nanosecond are used to first vaporized the target to a fully ionized state and then to heat the resulting plasma. The Lubin invention passes the main pulse through each of several linear chains of amplifiers only once in reaching the target, with the prepulse being split off from the same path after passing through a fraction of said amplifiers. The use of regenerative configurations to simplify laser design is not considered.

Regenerative amplifiers have been known since 1963 or before, but have never been applied in the present context. U.S. Pat. No. 3,243,724 to Vuylsteke teaches and claims a method for producing very short, high intensity laser pulses, using regenerative amplification techniques. A flashlamp produces population inversion in a cavity with end reflectivity turned off. After about 80% of the population is excited to a metastable state, end reflectivity is turned on and radiant energy within the cavity builds up by both spontaneous and stimulated emission, by extracting energy from the inverted excited state population. After the radiant energy density has increased to a peak, end reflectivity is again turned off and the radiation is quickly extracted from the cavity through a shunt path. Vuylsteke appears to contemplate only a moderately long lifetime upper state, such as present in a ruby rod, for example, and his excitation source is a flashlamp which pumps only once in a cycle.

U.S. Pat. No. 3,597,695 to Swain et al., teaches and claims use of one or many passes of a laser pulse through a single amplifier placed inside a cavity for laser amplification. The (polarized) laser pulse is injected into the cavity, containing the amplifier and two mirrors spaced therefrom, allowed to pass one or more times through the amplifier, and switched out of the cavity by polarity control using a Pockels cell. The amplifier is excited only once. The energy output of the amplifier is limited by damage to the weakest optical component, the Pockels cell; and Swain et al., appears to contemplate only the use of relatively long lifetime gain media, such as Nd: glass, where multiple excitation of the gain medium is unnecessary. Multiple excitation of the gain medium and utilization of short lifetime species is not discussed. Switching techniques other than the Pockels cell are not described.

U.S. Pat. No. 3,646,469 to Buczek et al., teaches and claims the use of a ring interferometer acting as a regenerative amplifier and being driven by a low power oscillator, with the amplifier gain just below the threshold for oscillation. The gain medium of this traveling wave regenerative amplifier is driven in only one direction around the ring and requires slaving the resonant frequency of the ring interferometer to the oscillator, which should have a spectrally pure output.

U.S. Pat. No. 3,414,835 to Miller teaches and claims the use of a closed path optical system to cause an injected laser pulse to be multiply reflected from two or more surfaces and to be periodically focused and refocused so that the light beam passes through a transparent workpiece or sample many times. No provision is made for rapidly and repetitively amplifying the laser pulse each time it traverses the optical system or for injecting the target into the cavity.

U.S. Pat. No. 3,668,536 to Michon teaches the use of a single amplifier with fully reflective means spaced from the ends of the amplifier, to reflect light back into the amplifier and cause said amplifier to respond as if it were several amplifier states in series. Pulse switchout means is also provided. Michon is forced to shorten high pulse initially, to avoid overlap between counter-propagating portions of the same pulse; and Michon does not indicate how his amplifier stages could be rapidly and repetitively pumped (evidently, at transit times $\gtrsim 3 \times 10^{-9}$ sec.).

No where in the patents cited above is there suggested to repetitively excite a regenerative amplifier as laser pulses are injected thru it. Michon pumps a laser rod and then passes the laser beam through the rod and reflects the laser beam back through the rod without exciting the rod again. The use of a rod instead of discs indicates a lower energy system. Two separate counter-propagating pulses are not considered. The use of spatial filters to improve beam quality in a regenerative amplifier is not suggested. Prior regenerative amplifiers did not have a long enough path length and the required power source for repetitive pulsing of a regenerative amplifier.

SUMMARY OF THE INVENTION

The subject invention, hereinafter referred to as a Multiply Excited Regenerative Amplifier (MERA), uses multiple passes of one or more injected laser pulses through a regenerative amplifier, which may be repetitively excited; an optical cavity containing the amplifier; a laser to produce the initial pulse(s); pulse injection means to introduce the pulse into the optical cavity; pump means to repetitively and transitorily excite the amplifier; and switch means to (1) position the target, means in the beam path, for irradiation or to (2) remove the laser pulse(s) from the cavity and direct them to any one of many well known end uses of the laser pulse. Each pulse is caused to pass through the amplifier(s) many times by two or more reflective means, such as mirrors, which serve to return the pulse, via the same or a different path, through the amplifier(s). The "round trip" path length for each pulse may be quite long ($\gtrsim 100$ meters) in order to allow for repetitive pulsing of the amplifier medium, shaping of the laser pulse(s) or activation of the switch. After the pulse(s) has reached a predetermined level (usually energy saturation) in the amplifier it is ready to be used. One such use is that of a target means being irradiated to produce a high temperature plasma by either (1) quickly moving the target into position within the target chamber, located within the optical cavity or (2) optically switching the laser pulse out of the optical cavity so that the pulse is incident upon the target means in an externally located target chamber. In both cases for a target means and other end uses more than one regenerative amplifier cavity may be employed if irradiation from more than two directions is desired, or additional pulse pairs may be stacked in the regenerative amplifier.

One object of this invention is to provide a high power laser using a multiply excited regenerative amplifier.

Another object of this invention is to amplify one or more injected laser pulses by repetitively exciting the amplifiers in between each pass of a pulse thru an amplifier.

Another object of the invention is to reduce the capital outlay of laser amplifier systems by using multiply excited regenerative amplifiers.

Another object of this invention is to provide a new approach to the production of plasmas, neutrons and x-rays which unifies the class of laser amplifiers by allowing the use of gain media transitions with either long or short radiative lifetimes and wavelengths. Such a laser system could irradiate targets at 1 to 100 Hz repetition rates, and would thus be a suitable system for a reactor plant.

Other objects, and advantages of this invention, will become apparent from the following detailed description of preferred embodiments, as illustrated in the accompanying drawings.

BRIEF DESCRIPTION OF THE DRAWINGS

FIG. 11 is a schematic view of a preferred embodiment of the invention showing a MERA operated in a "beam switch" mode, using a single, linear path for propagation of the laser pulse(s).

DETAILED DESCRIPTION OF THE INVENTION

Figure 1:
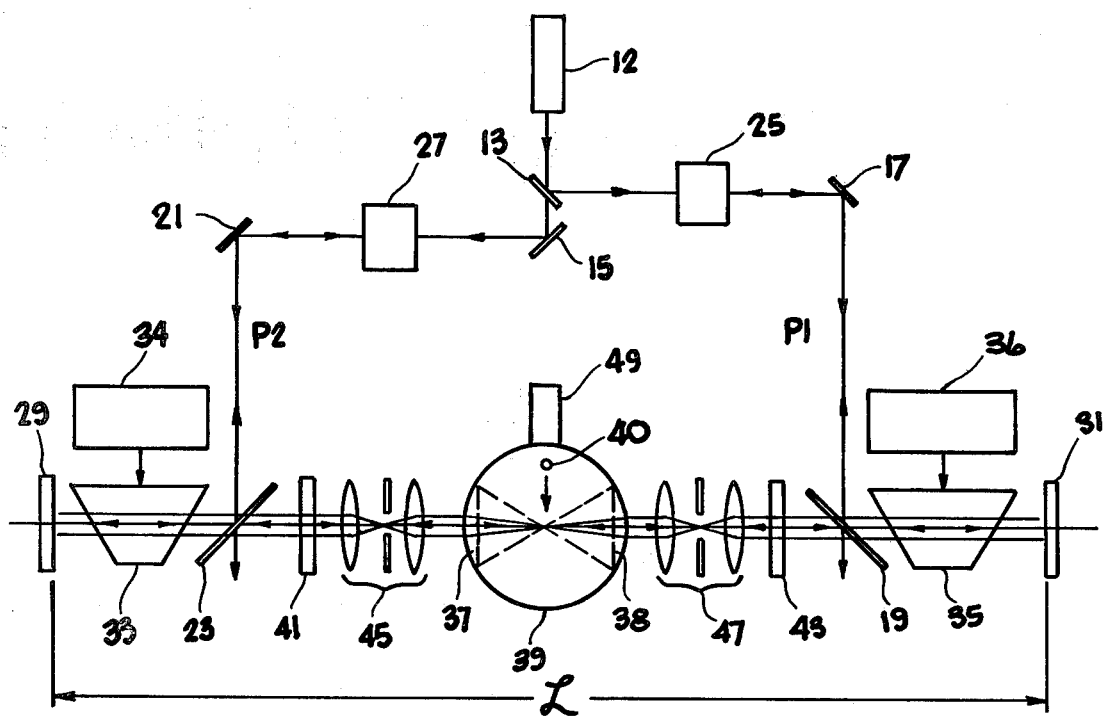
FIG. 1 is a schematic view of a preferred embodiment of the invention with a single, linear path for propagation of the laser pulse(s) in a MERA operating in the "particle switch" mode for production of plasmas, neutrons and x-rays in an inertial confinement system.

In the laser technology there has always been the goal of obtaining high power laser systems for which the economic considerations are not so burdensome. The uses to which high power laser systems can be put are well understood in the field, see Lubin U.S. Pat. No. 3,723,246 which is incorporated herein by reference. Hereinbelow one of those well known uses, in an inertial confinement system as a preferred embodiment of the invention, will be used to more fully explain the invention.

Considerations of laser-initiated production of high temperature and density plasmas from a target often begin by positing the following laser requirements: (1) wavelength $\lambda \sim 300-2000$ nanometers; (2) pulse duration $\Delta t \lesssim 100$ nanoseconds; (3) pulse energy (after amplification) $\sim 10^5-10^6$ joules; and (4) laser efficiency $\gtrsim 1\%$. In designing a system to achieve these conditions, one may begin by assuming appropriate energy storage for single pulse extraction from the amplifiers (e.g., 10–100 joules/liter) and derive requirements on inversion density (e.g., $10^{16}-10^{17}$ cm$^{-3}$) and gain cross-section (e.g., $10^{-19}$–$10^{-20}$ cm$^2$). The radiative lifetime of the laser transition in this case is typically greater than several hundred nanoseconds, allowing the achievement of large stored energy densities with reasonable pumping rates. This approach places severe constraints on the laser medium. The excited medium must be particularly stable with respect to collisional and collective relaxation processes. Alternatively, one may begin with a prescription of gain crosssection (e.g., $10^{-16}$–$10^{-17}$ cm$^2$) and derive requirements for energy storage (e.g., 0.1–1.0 joules/liter) and inversion density (e.g., $10^{14}$–$10^{15}$ cm$^{-3}$). As a consequence of the large gain cross-section in this case, the radiative lifetime of the laser transition is generally less than several tens of nanoseconds. Efficient laser operation in this latter approach requires multiple short pulse excitation and pulse energy extraction on the timescale of the radiative lifetime. This method puts the burden on the technology, not on the laser medium. The subject invention unifies these two techniques by providing one basic approach to the design of laser produced plasma systems which may use short lifetime or long transitions. Where certain rare earth-doped glasses and other media with transitions having lifetimes of several microseconds or more are used, it may be necessary only to pump the amplifier once or a few times. However, for some applications time-tailored pumping may be advantageous. These rare gas halides and other gases with transitions having lifetimes $\tau_r \sim$ 0.1–1.0 microseconds or less are used, repetitive pumping of the amplification medium in a burst mode at, say, $10^4$ Hz or higher is employed. In this approach one's choice of amplification media, from among those which manifest laser action, is limited primarily by the achievable rates for repetitive pump sources. If one could devise a pump with a repetition rate $\gtrsim 10^9$ Hz, possibly any laser medium could be used for the amplifier herein, provided a suitable cavity could be fabricated. One such rare earth-doped glass amplifier system is described in the patent application Ser. No. 868,633, filed by Emmett et al, filed on the same day herewith, assigned to the assignee of this application, which is incorporated herein by reference. This invention uses the 4f–5d transition of suitable rare earth dopants to produce bands of tunable radiation in or near the visible spectrum.

Generically, the subject invention is directed to a laser system, per se with sufficient path length, which uses: (1) multiple passes of one or more synchronously propagating laser pulses through one or more singly or repetitively excited regenerative amplifiers to saturate the energy contained in each pulse; and (2) power conditioning, matched to the particular amplifier medium, either to repetitively excite the amplifier at rates $\gtrsim 10^4$ Hz in a burst mode or to singly excite a long lifetime amplifier medium. The path length is chosen to be sufficiently long (possibly a kilometer or more) to allow time for the repetitive pulsing and laser beam modification and switching. Relaxation of the onerous laser medium criteria is achieved through use of an amplifier storage ring design, which puts the burden on the remainder of the technology.

When two counterpropagating laser pulses are used for irradiating a target means, the target chamber containing the target may be positioned at or near the center of the amplifier optical cavity equidistant from the injection point of the two pulses. Target irradiation is then accomplished by either (1) quickly moving the target into position within the chamber, located within the amplifier cavity (hereinafter, the "particle switch" mode), or (2) optically switching the laser pulse(s) out of the main path and optical cavity so that the pulse is incident upon the target in an externally located target chamber (hereinafter, the "beam switch" mode).

Figure 2:
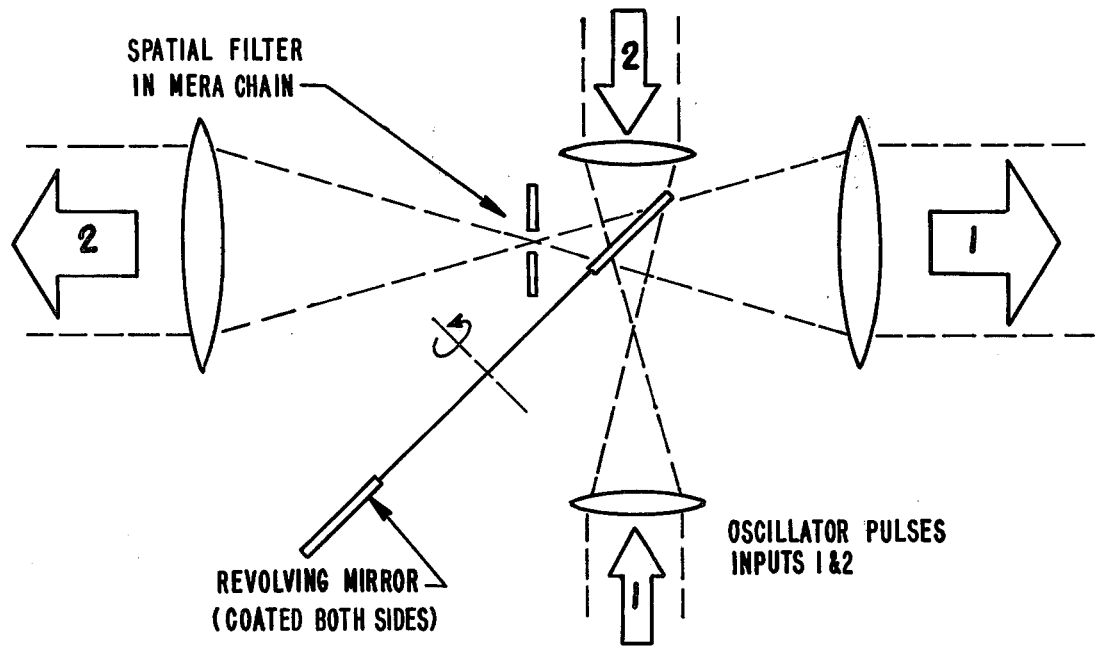
FIG. 2 is a schematic view of a technique for master oscillator pulse injection into a MERA by revolving mirror.

A preferred embodiment of the invention, employing the "particle switch" mode, is illustrated in FIG. 1. A master oscillator laser 12 delivers an initial pulse which is split into two equal parts by a beam splitter 13 and a fully reflecting mirror 15 and is sent through isolators 25 and 27 along paths P1 (defined by fully reflecting mirror 17) and P2 (defined by fully reflecting mirrors 15 and 21). The initial laser pulse at 12 may be delivered by any laser whose output wavelength is matched to the gain bandwidth of the amplifiers 33 and 35. As shown in FIG. 1, the two beams from the master oscillator are then injected into the cavity formed by mirrors 29 and 31, using two partially reflecting ($\sim 1\%$ reflectivity at the chosen wavelength) mirrors 19 and 23. Other possible injection schemes, such as illustrated in FIG. 2, may be employed. It is desirable to inject oscillator pulses into the cavity in a discrete fashion so that losses are not introduced when the system is in its free-running regenerative mode. The revolving mirror technique has the unique advantage that it introduces no loss into the cavity (FIG. 2). After the oscillator pulses have been injected into the cavity, the mirror is moved by rotation out of the optical aperture before the next pulse passage occurs. The isolator 25 and 27 suppress any prepulse issuing from the laser 12 and isolate the oscillator from large amplitude pulses, which might be returned from the regenerative amplifier by beam splitters 19 and 23 if a revolving mirror is not employed. Oscillator prepulse suppression can be accomplished using saturable absorbers and/or fast electro-optical shutters. If a revolving mirror is not employed, the large pulse isolation requires a non-reciprocal optical element such as a polarized followed by a Faraday rotator. The polarizer is positioned between the oscillator and the Faraday rotator and rejects the return pulses. These isolation techniques are well known in the art of high power laser design and have been used to achieve 60 db and more of isolation in certain applications. The mirrors 29 and 31 of the optical cavity may be multilayer dielectric mirrors, constructed in the well-known manner to have high reflectivity ($\sim 99.8\%$) and low loss ($\lesssim 1\%$) at the laser wavelength. Such mirror designs have achieved high damage thresholds (10 J/cm$^2$ for nanosecond pulse durations) which are also desirable in the present applications: it is damage threshold which limits the laser pulse energy that can be generated.

The injected oscillator pulses are largely trapped between the two mirrors 29 and 31 and caused to undergo multiple passes by reflection from 29 and 31. As shown in FIG. 1, the center of the target chamber 39, where the target is to be irradiated, is positioned at the optical center of this cavity, formed by mirrors 29 and 31 so that the two counterpropagating pulses pass one another at this point. The entire optical path between the amplifiers 33 and 35 and target chamber 39 may be enclosed in an evacuated chamber, maintained at a modest vacuum (p $\sim$ 1 Torr) by conventional continuous pumping techniques, in order to optimize laser pulse propagation. Located on each side of the target chamber is a focusing lens 37 and 38 to narrow the beam(s) (in the transverse direction) and a repetitively-pumped gain medium 33 and 35 (which may be pumped at a rate of $\gtrsim 10^4$ Hz in a burst mode of operation) to sequentially build up the energy of each counter-propagating laser pulse as it passes through said medium. Saturable absorbers 41 and 43 (optical) prevent amplification of the fluorescent radiation emitted by the amplifiers. Spatial filters and/or optical relays 45 and 47 (also optical) are used to clean up phase and amplitude distortions imposed upon the laser pulses during amplification. These systems may be of conventional design, such as is shown in The University of California Report UCRL-78995 (1976) by Hunt and Renard.

The saturable absorbers 41 and 43, whose use is optional, may be included to suppress any prepulse emitted by the laser or master oscillator 12 or any parasitic pulse issuing from the amplifiers 33 and/or 35. Suppression is not necessary but is very desirable in a high gain amplifier system such as used here, for two reasons. First, the passage of a prepulse or parasitic pulse through the gain medium many times will tend to amplify the disturbance and thus deplete the population inversion achieved by pumping, at the expense of the main pulse which follows. Second, the amplified disturbance may be sufficiently energetic that it can damage the target or otherwise degrade system performance. The principles of operation and design of saturable absorbers are well known in the art: see Thorne et al., in 45 Journal of Applied Physics 3072 (1974) and Harrach et al., in University of California Report UCRL-51008 (1971).

The spatial filters 45 and 47, whose use is also optional, may be included to remove high spatial frequency noise from the counter-propagating pulses. The method of design and application of spatial filters is well known in the art of high power laser design as described by Glaze in 15 Optical Engineering 136 (1976). The saturable absorbers and spatial filters are two examples of beam transformation apparatus used within the optical cavity to control the quality of the beam. Another example of such beam transformation apparatus is temporal pulse shaping apparatus which shapes each pulse as a function of time for improvement of target performance. Temporal pulse shaping may be carried out by saturable absorber or by various methods of pulse stacking, as taught and claimed by Thomas in U.S. Pat. No. 3,979,109 (issued Apr. 22, 1975) and by R. C. Harney, et al, in U.S. Pat. Nos. 4,053,763 (issued Oct. 11, 1977) and 4,059,759 (issued Nov. 22, 1977), assigned to the assignee of this application. Temporal pulse shaping apparatus may be positioned internal to or external to the optical cavity.

Beam transformation apparatus also includes spatial pulse shaping apparatus, wherein each pulse is reshaped as a function of the transverse radial coordinate so as to minimize diffraction, improve the lens fill factor or attain other worthy goals. One method of spatial pulse shaping uses a beam apodizer, wherein the beam is passed through a lens whose transmission varies with the transverse radial coordinate. This method is also discussed by Glaze, supra.

The gain media used in the amplifiers can be chosen from a wide range of coherently pumped and flashlamp photon pumped solid state laser media such as Nd-, Er-, Tm- or other rare earth-doped glass, $CaF_2$ or other suitable solids. The gain media may be photolytic gases such as $O_2$, $CO_2$, $N_2O$, OCS, OCSe, or $CF_3I$. Alternately, mixtures of gases such as (Ar or Ne)/KrF, (Ar or Ne)/Xe/$F_2$, and other rare gas-halogen mixtures or pure rare gas, maintained at a pressure on the order of one atmosphere and excited by a high energy electron beam; an electric discharge or a combination electron beam-sustainer discharge may also be employed for pumping. The pumping of these media is optimized in the following manner. If $\tau_r$ is the radiative lifetime of the gain medium and $\tau_p$ is the pump-time for a single excitation, one seeks to make $\tau_p \lesssim \tau_r$ for efficient utilization of the medium. The pulse transit time $\tau_t = L/C$ is determined by whatever form of switch is employed and the length of the system, and is also limited by the repetition rate for the amplifier pumps 34 and 36. For instance, if the switch time constant is 1 $\mu$sec, the cavity must be 300 m in length. Furthermore, if $\tau_r < < \tau_t$, efficient utilization of the laser medium requires the amplifiers be excited only during passage of the laser pulses through them. Alternatively, if $\tau_r > \tau_t$, the laser medium may need to be pumped only once over a period of time sufficient to achieve the desired level of amplification. In any case, consistent with parasitic and superfluorescent loss conditions, the gain in the medium may be adjusted, by time tailored pumping to effectively overcome losses and achieve laser pulse saturation as soon as possible (in 2–10 passes). After this, the circulating laser pulses efficiently extract optical energy from the amplifiers during each pass. Associated gain medium efficiency is limited only by the pumping technique: for electron beam excitation of gases, $\lesssim 40\%$ can be expected; and for resonant photon pumping of solids, efficiencies approaching 50% are possible.

As the two injected counterpropagating pulses grow in amplitude they continue to simultaneously cross at the center of the target chamber 39, with a period set by the distance between mirrors 29 and 31. The target irradiation is then accomplished by placing the target 40 in the laser focal region in the time interval between the (N−1)th and Nth pass, by the returning focused laser pulses. The target thus acts as its own optical short circuit or switch. More than one regenerative cavity may be employed, and the target can be irradiated symmetrically and simultaneously from two or more directions. Target irradiation rates of 1–100 sec$^{-1}$ are feasible.

The subject invention may use one or a pair of gaseous gain media in each arm of the system, and the only glass components of any significance are the lenses 37 and 38 located at either side of the target chamber 39. These lenses may be replaced by spherical or off axis offaxis parabolic reflectors, and amplifier aerodynamic windows may be employed to eliminate all solid components from the laser path within the system. As mentioned above and discussed in more detail below, amplifiers using available high efficiency gaseous laser media seem most promising. However, solid state amplifiers could also be used. The problem of target positioning is no more severe here than in the case for conventional repetitive positioning of a target.

The target may be a glass or plastic microballoon, with interior filled with hydrogen or with a deuterium-tritium mixture at many atmospheres pressure, such as shown by Lewkowicz in 7 Journal of Physics(d) pp. L61-62 (1974). Other known targets developed in the field of fusion for high temperature plasma production and neutron or x-ray generation may also be used. The target chamber 39 may be sustantially a hollow sphere, constructed of steel, generally about 4 cm thick, of a diameter substantially 4 meters. The target chamber 39 will have two or more substantially antipodal apertures of diameter substantially two meters each, the apertures each containing a focusing lens 37 and 38 of focal length substantially two meters, to focus the collimated light to a small diameter at the center of the chamber. The target chamber 39 will also have a third, smaller aperture located on a great circle midway between the two lens apertures for introduction of the targets seriatim into the chamber. Calculations indicate that approximately one monolayer of target material may be deposited on the lenses interior to the target chamber for each target implosion. Thus, the lenses 37 and 38 would not need to be cleaned at least until $10^3$–$10^4$ targets have been imploded, depending upon the wavelength of the laser 12. These and other considerations will be considered in more detail.

Consider first the highly efficient gaseous laser systems such as XeF* and KrF*, derived from the electrical excitation of mixtures of rare gases and fluorine. The means of excitation is arbitary; electron beam or electrical discharge could be employed. At this time, electron beam excitation is more attractive. This method has shown higher efficiencies and offers the possibility of uniform medium excitation, whereas one has the well-known stability problem for large volume excitation by electric discharges. For XeF* $\#_p \sim 30$ ns, and if the cavity transit time $\tau_t > 1$ μsec (system requirement), triode or tetrode electron beam sources may be employed.

The physical size and characteristics for one example of a MERA amplifier which is excited by an electron beam source, are shown in Table 1. The total energy output from one module, denoted by $E_L$, is related to the damage fluence of the material $\Gamma_{mat}$ by the expression.

$$E_L = \pi/4 D^2 \Gamma_{mat} = \pi/4 D^2 L \xi \eta \qquad (1)$$

Here $\xi$ is the medium excited stated energy density, L is the length of the gain medium and $\eta$ is the number of passes. Taking for the damage fluence $\Gamma_{mat} - 1$ J/cm² (a conservative value for short pulse width laser systems) one finds $E_L = 30$ KJ. The number of passes $\eta$ may vary, reflecting the range of stimulated emission-cross section $\sigma_s$ values and excited state densities in Table I.

TABLE 1

Design Characteristics for An Amplifier Module

For a laser medium described by a solid right cylinder with dimension D as the diameter and L as the length, then the following can be stated:

| CHARACTERISTIC | VALUE |
| --- | --- |
| ASPECT RATIO L/D | >2 |
| PARASITIC SUPPRESSION (TRANSIENT) $\alpha L = \sigma_S$ NL | 5 |
| GAIN CROSS-SECTION - $\sigma_S$ (cm²) | $10^{-16}$–$10^{-17}$ |
| GAIN LENGTH L (cm) | 500 |
| DIAMETER D (cm) | 200 |
| EXCITED STATE DENSITY N (cm$^{-3}$) | $10^{14}$–$10^{15}$ |
| ENERGY STORAGE - $\xi$ (J/l) | 0.1–1 |
| ELECTRON BEAM ENERGY - $E_B$ (MeV) | 1–2 |
| ELECTRON BEAM CURRENT DENSITY - $J_B$ (A/cm²) | 1–10 |

The evolution of the energy fluence $\Gamma$ of the laser beam, as it proceeds back and forth through the amplifier medium, is described by the Frantz-Nodvik equation $$\Gamma = \Gamma_s \ln[1 + e^{\alpha x}(e^{\Gamma_I/\Gamma_s} - 1)], \qquad (2)$$

where $\Gamma_I$ and $\Gamma_s$ are the initial and saturation fluences and $\alpha$ is the small signal gain. If the lower laser level is rapidly relaxed during the duration of the laser pulse excitation, $\Gamma_s = h\nu/\sigma_s$. However, if relaxation does not occur, $\Gamma_s = g_L/g_L + g_u (h\nu/\sigma_s)$, where $g_L$ and $g_u$ are the degeneracies of the lower and upper laser level, respectively. For the candidate molecules KrF* and XeF*, $\Gamma_s \approx 8$ mJ/cm² and $\Gamma_s \approx 5.6$ mJ/cm², respectively. For high energy output, then, these systems must be heavily saturated: $\Gamma_{laser} \approx \Gamma_{mat} >> \Gamma_s$. Table 2 summarizes the amplifier characteristics for a XeF* system. Since the amplifier is designed to run at the damage limit of the mirror material, the total number of passes can be reduced by a factor of two if each amplifier is excited twice (once for each traveling wave pulse passing therethrough).

In the amplifier design considerations hereinbefore the cavity was assumed to be loss-less, which is generally not the actual case. Some loss is associated with the intrinsic characteristics of the optical elements, and additional losses are associated with the mirrors, lens elements, etc. In an effort to evaluate these losses it is important to assess their deleterious effects on the performance of the present device since $\Gamma_{laser} >> \Gamma_s$.

Figure 3:
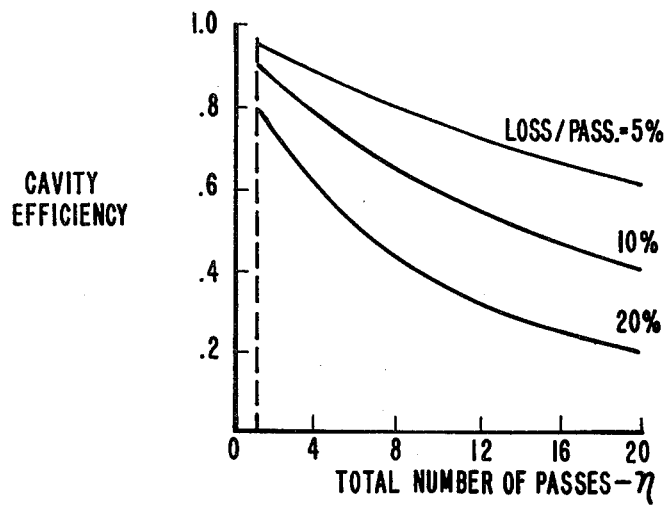
FIG. 3 is a graphic illustration of the dependence of the optical efficiency of a MERA laser as a function of the number of passes of a laser pulse through the amplifier.

If $E_O = \xi Al$ is the saturated energy added per pass through the amplifier and $\epsilon$ is the lumped optical loss per pass, then the total laser output energy is $$E_L = E_O x/(1-x)(1-x^\eta), \qquad (3)$$

where $x = 1 - \epsilon$. In the limit that $x \to 1$ and/or $\eta \to \infty$, this expression reduces to the familiar expressions for a lossless or lossy cavity. One can define a figure of merit for the cavity as follows:

$$\text{Cavity efficiency} = 1/\eta(x/1-x)(1-x^\eta), \qquad (4)$$

which for $x \to 1$ is the result employed in the previous discussion. In FIG. 3, Eq. (4) is plotted for several values of $\epsilon$.

As anticipated, the performance of the device deteriorates markedly as $\eta$ increases (for a fixed value of x), indicating a tradeoff within the system. It is worth noting that for a saturated linear amplifier with a loss per stage given by $\epsilon$, an expression given by Eq. (3) is also obtained. Typically, $\epsilon$ will be 2–10%. On the basis of Table 2 and FIG. 3, then, powerful laser pulses can be generated using the technique set forth in this invention.

TABLE 2

Design Characteristics for a Single Aperture XeF Amplifier

| | |
| --- | --- |
| GAIN CROSS-SECTION $Q_S$ (cm²) - $\sim 10^{-16}$ | AMPLIFIER LENGTH L (cm) - 500 |
| RADIATIVE LIFETIME - $\tau_L$(NS) - 15 | AMPLIFIER DIAMETER D (cm) - 200 |
| PHOTON ENERGY - h$\nu$ (J) - 6 × $10^{-19}$ | TOTAL ENERGY - $E_L$ (J) - 3 × $10^4$ |
| SATURATION FLUENCE $\Gamma_{SAT}$(J/cm²) - 6 × $10^{-3}$ | NUMBER OF PASSES $\eta$ - 33 or 16 |
| INVERSION DENSITY N (cm$^{-3}$) - $10^{14}$ | EXCITATION PULSE TIME $\tau_P$ (NS) - 30 |

TABLE 2-continued

Design Characteristics for a Single Aperture XeF Amplifier

| | |
|---|---|
| ENERGY STORAGE (J/l) - 6 × 10$^{-2}$ | TRANSIT TIME $\tau_T$ (μS) - 13 |
| DAMAGE FLUENCE $\Gamma_{MAT}$ (J/cm$^2$) - 1 | ELECTRON BEAM ENERGY $E_B$ (eV) - 1.5 × 10$^6$ |
| GAIN - LENGTH RODUCT $\alpha L$ - 5 | ELECTRON BEAM CURRENT DENSITY $J_B$ (A/cm$^2$) - 2 - 4 |
| MEDIA PRESSURE - (ATM) - 0.1–1 | MEDIUM EFFICIENCY (%) - ~ 10 |

Figure 4:
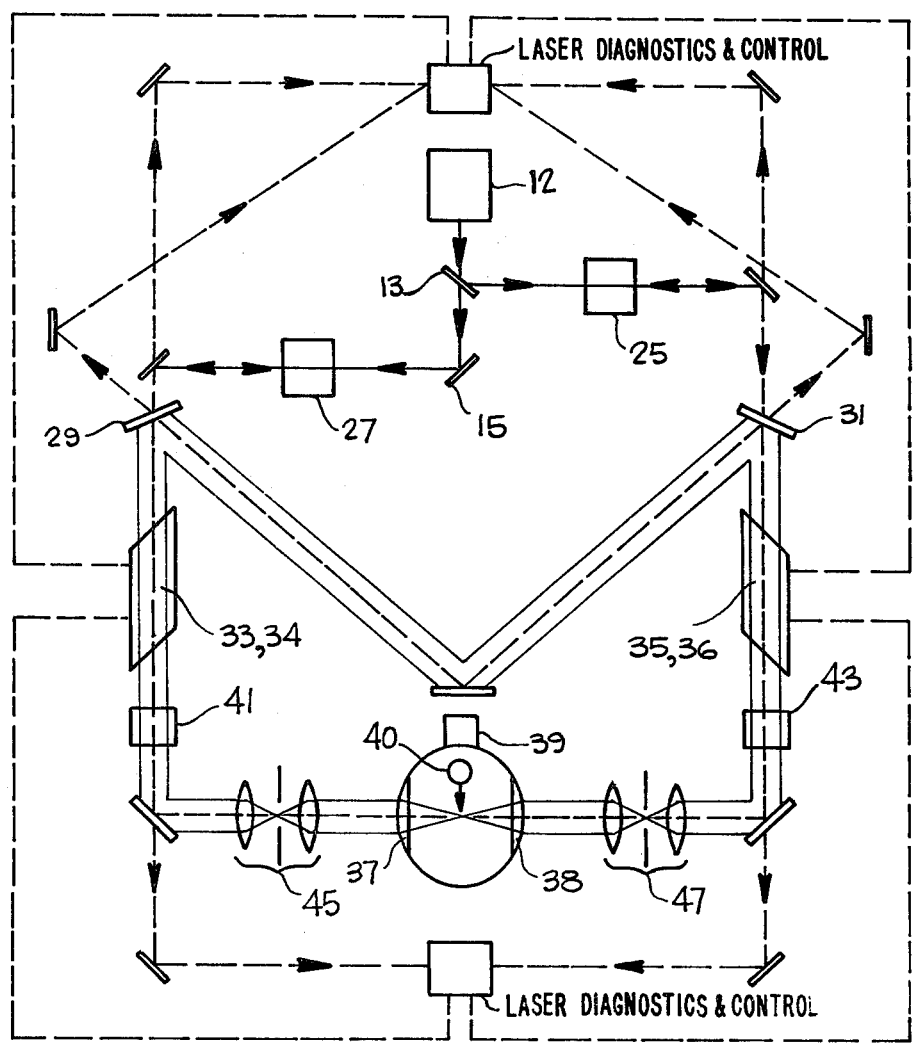
FIG. 4 is a schematic view of another preferred embodiment of the invention, showing a folded path configuration for propagation of the laser pulse(s) in a MERA operating in the "particle switch" mode.

Design of a particle injection system involves a trade-off between laser system optical path length L and particle injection technology. The total laser system length can be minimized, without significantly increasing the volume required to house the system, by using a MERA ring machine configuration such as shown in FIG. 4. In this case, for a long system, the perimeter L of the ring is roughly four times the total system length. Insertion of the target prior to arrival of the final irradiation pulses requires that the particle move into the irradiation volume from a position $r_{\eta-1}$ (where it was undamaged by earlier pulses). The target velocity required is then $V_t$, given by $$V_t = \frac{d_t}{2\tau_t} \left[ 1 + \left\{ \ln \left[ \frac{4 E_{\eta-1}}{\pi d_t^2 \Gamma_{mat}} \right] \right\}^{1/n} \right], \quad (5)$$

for an $n^{th}$ power exponential intensity distribution in the focal plane, where $E_{\eta-1}$ is the laser output energy per beam prior to the final amplification cycle. For a saturated system, this is nearly the final laser output $E_L \sim 3 \times 10^4$ Joules, with $d_t \sim 1$ mm and $\Gamma_{mat} \sim 1$ J/cm$^2$, and therefore the velocity required in this case is $v_t \approx 2.5 d_t/\tau_t$ for n=2 (Gaussian distribution). For a laser system 4 km long, the injection velocity required is then $v_t \approx 1.9 \times 10^4$ cm/sec. However, since the ratio of the laser pulse length (~1 ns) to transit time $\tau_t$ is $10^{-3}$, the target is essentially stationary during irradiation. If the target mass is 500 μgm, the kinetic energy invested in the target is small: K.E.$_t \sim 9$ mJ.

Figure 5:
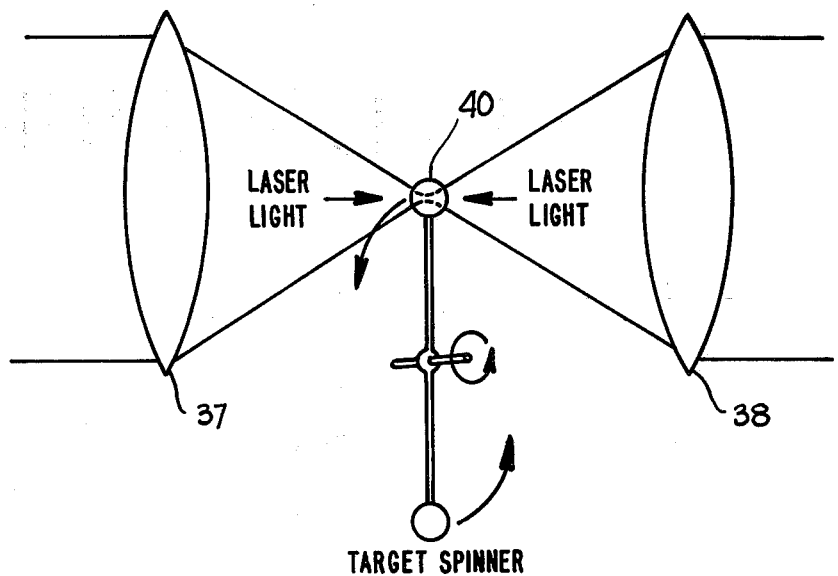
FIG. 5 is a schematic view of a mechanical target insertion technique for use in a MERA operating in the "particle switch" mode.

In one embodiment targets can be positioned mechanically by placing them on a rotating device as shown in FIG. 5. Precise orientation of the target relative to the axis of rotation is achieved in this system by mounting prior to spin-up. Analysis of a simple system indicates that for a 500 μgm target and a laser with a 4 km path length, the spinner can be rotated at 60 Hz with a total energy inventment of ≲100 J. Deformation of the target due to the centrifugal force is probably tolerable. As an example, for a 10:1 aspect ratio spherical shell made of beryllium, the strain in the mid-plane would be ~2×10$^{-7}$; for other materials the strain might approach ~10$^{-6}$. This would not significantly perturb volumetric compression ratios of 10$^6$–10$^8$. If the target is attached to the spinner by a 100 μm diameter joint, the stress at the joint is ~5×10$^7$ dyne/cm$^2$, which is much less than the tensile strength of most materials.

Figure 6:
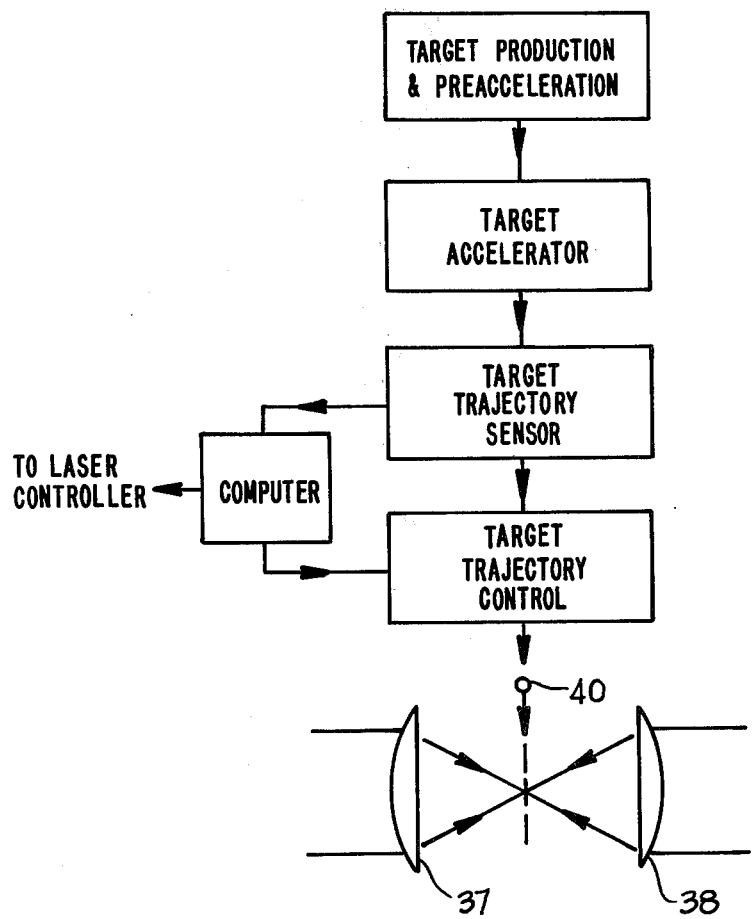
FIG. 6 is a schematic of one embodiment of the trajectory control apparatus for the electrically charged target, used in a MERA operating in the "particle switch" mode.

If electrodynamic techniques, as in FIG. 6, are employed to accelerate and guide the particle, the acceleration voltage $V_{ac}$ is simply $$V_{ac} = m_t 2 q_t V_t^2, \quad (6)$$

where $q_t$ is the charge on the particle. For a given laser configuration, the acleration voltage is minimized by minimizing the target mass-to-charge ratio, $m_t/q_t$. For positively charged solid particles this ratio is minimized, and the limit on applied voltage is determined by target break-up due to electrostatic forces. The minimum mass-to-charge ratio is reached when electrostatically-induced stresses equal the tensile strength $S_t$ of the material. The minimum target acceleration voltage required for a spherical shell with Gaussian irradiation profile becomes $$(V_{ac})_{min} = \frac{m_t}{8\pi \tau_t^2 [4\epsilon_0 S_t t_t/d_t]^{\frac{1}{2}}} \left[ 1 + \left\{ \ln \left( \frac{4 E_{\eta-1}}{\pi d_t^2 \Gamma_{mat}} \right) \right\}^{\frac{1}{2}} \right]^2, \quad (7)$$

where $d_t$ is shell diameter and $t_t$ is shell thickness.

Where the outer surface of the target is a 10:1 aspect ratio beryllium shell. With the total target diameter and mass are 1 mm and 500 μgm, respectively, and the laser parameters are $E_L \sim 3 \times 10^4$ J and $L \sim 4$ km, then the minimum acceleration voltage is $(V_{ac})_{min} \sim 3.9 \times 10^5$ V. Particle accelerations of $10^4$–$10^5$ cm/sec$^2$ would not be unreasonable. Plastics and other metals require similar acceleration voltages. Accelertion voltages up to about 15 MV can be achieved with linear Van de Graff type accelerators.

After acceleration, the target's trajectory will be corrected with electric and magnetic fields to insure accurate positioning in the irradiation volume. For a simple deflection system consisting of parallel charged plates of length $L_E$ located a distance $L_T$ from the target plane, an electric field E between the plates will deflect the particle a distance $Y_e$, where $$Y_E = E L_E / 2 V_{ac} (L_T + \tfrac{1}{2} L_E). \quad (8)$$

For $L_E = 10$ cm, $E = 10^4$ V/cm and $V_{ac} = (V_{ac})_{min}$, the beryllium shell target above would be deflected $Y_E$(cm) = 0.6 + 0.13 $L_T$(cm), indicating that accurate positioning of targets with simple quadrupole plate configurations is simple and straightforward. An electrostatic target injection system similar to that described in FIG. 6 has been developed at Lawrence Livermore Laboratory which allows delivery at a rate of 1 per second of targets, moving at speeds up to 5×10$^3$ cm/sec, into the focus of a lens at a distance of 3.5 m with an accuracy of ±50 μm. Similar results have been obtained by others, as shown in Table 3.

TABLE 3

PARTICLE ACCELERATION ACCOMPLISHMENTS

| PARTICLE | D | V | POSITIONING ACCURACY | METHOD | REFERENCE |
|---|---|---|---|---|---|
| O$_2$, AR LIQUID DROPLETS | 25 μM | 10–20 M/sec | ± 5 μM at 25 cm | FLUID DYNAMIC | C. D. HENDRICKS AND T. C. ANESTOS UNIVERSITY OF ILLINOIS |
| NH$_3$ | 100–150 μM | ≲ 50 M/sec | ± 50 μM at | FLUID DYNAMIC | G. PORTER |

TABLE 3-continued
PARTICLE ACCELERATION ACCOMPLISHMENTS

| PARTICLE | D | V | POSITIONING ACCURACY | METHOD | REFERENCE |
|---|---|---|---|---|---|
| SOLID | | | 3.5 M | ACCELERATION ELECTRODYNAMIC POSITIONING | LAWRENCE LIVERMORE LABORATORY |
| $H_2$ SOLID | 75–100 μM | 20–100 M/sec | — | FLUID DYNAMIC ACCELERATION | C. FOSTER, C. D. HENDRICKS AND K. KIM UNIVERSITY OF ILLINOIS AND OAK RIDGE |
| DIAMOND SPHERES | 1 μM | ≲ 7000 M/sec | — | ELECTRODYNAMIC ACCELERATION | J. F. VEDDER REV. SCI. INST., 34, 1175 (1963) |

In the design of a MERA laser system, as a consequence of its great length when operated in the "particle switch" mode, it is necessary to give careful consideration to the propagation of the laser radiation within the regenerative cavity. Due to the large aperture and the short emission wavelength of the MERA laser outlined here, the natural diffractive divergence of each pulse per pass is quite small; for XeF* ($\lambda = 351$ nm), the radial expansion per pass is $\Delta r \sim (\lambda/D)L \sim 10^{-1}$ cm. However, several sources can produce laser pulse phase and amplitude distortion that may greatly complicate the propagation and target irradiation problem. Some of the more important sources are likely to be: gas flow turbulence in the amplifiers and beam tubes, non-uniform volumetric energy deposition, small scale and whole beam self focusing in solid state optical gain components and amplifier saturation, and shock wave generation by electron beam-foil loading.

The deleterious effects of gas flow turbulence can be minimized by evacuating and filling beam tubes with Helium or Neon to a pressure of 0.1–1.0 Torr and using low Mach number flows with proper conditioning in the amplifiers. Uniform excitation will require careful analysis and design. The effect of large scale nonuniformities may be compensated to some extent by using spatial filters and optical relay techniques, wherein the cavity with internal optical elements is designed to be self imaging. The effects of self focusing in solid state components may also be controlled by using this image relay technique. The propagation of highly saturated pulses, as where KrF* or XeF* are employed in the amplifiers, is a potentially serious problem; these effects can be minimized by using high fill factor super-gaussian radial profiles, imaging cavity techniques and some form of internal temporal pulse shaping.

The amplifier medium problem is actually two problems with substantially different time scales: (1) laser amplifier medium degradation during the multiple excitation cycle, and (2) laser amplifier medium clean-up between target irradiation events. The latter problem must be addressed in any usable gas laser device. However, the first problem, medium degradation during multiple excitation, is unique to the MERA concept and is compounded if the system is large.

If the characteristic dimensions of the refractive index perturbation parallel and perpendicular to the radiation propagation direction are $1_\parallel$ and $1_\perp$, respectively, the relative density fluctuation which produces a deflection comparable to diffraction is $$(\Delta\rho/\rho_o)_\perp \approx 1/\beta \; 1_\perp/D \; \lambda/1_\parallel \; \rho_s/\rho_o, \tag{9}$$

where $\rho_o$ and $\rho_s$ are the amplifier operating density and atmospheric density under standard conditions, respectively. The refractive index perturbation is $\Delta\mu = \beta\Delta\rho/\rho_s$. The quantity $(\Delta\rho/\rho_o)_\perp$ is the relative density fluctuation normal to the direction of propagation of the laser light. In the ultraviolet, the parameter $\beta$ is sensitive to particular gas species present and is smallest for Helium and Neon. In the estimates made in this section, it is assumed that the gas mixture contains a large Helium fraction; the results for Neon are similar. For a disturbance in the MERA system under consideration with $1_\perp \sim 1_\parallel$, the relative density fluctuation $(\Delta\rho/\rho_o)_\perp$ is approximately $4 \times 10^{-3} (\rho_s/\rho_o)$. Fluctuations greater than this will begin to destroy beam quality. At atmospheric density this level is roughly an order of magnitude above what is achievable by proper fluid dynamic conditioning of the gas flow, and so presents no problem. However, at densities than atmospheric, density fluctuations are a potentially serious problem. For density perturbations of magnitude $$(\Delta\rho/\rho_o) \approx 1/\beta \; D/1_\parallel \; 1_\perp/L \; \rho_s/\rho_o \tag{10}$$

the pulse will be deflected out of the system aperture. For the same conditions as above, $(\Delta\rho/\rho_o)_\perp \sim 14 (\rho_s/\rho_o)$, and phase distortions of the wavefront of the pulse will be the limiting factor. Of course, shock-like disturbances with $1_\perp \ll 1_\parallel$ are intolerable. A relative density variation across the beam that produces a phase distortion of one wave ($\Delta\phi_\perp \sim 2\pi$) is $$(\Delta\rho/\rho_o)_\perp \approx 1/\beta \; \lambda/L \; \rho_s/\rho_o \tag{11}$$

which, for the conditions as above, become $(\Delta\rho/\rho_o)_\perp \sim 10^{-3} (\rho_s/\rho_o)$. This is slightly less than the condition required for pulse amplitude modulation, and therefore the same remarks are applicable.

Uniform excitation of the MERA amplifier media will be essential to achieving low density fluctuation levels immediately prior to and during each multiple excitation cycle. A measure of the uniformity requirement can be seen by considering the rise $\Delta T_g$ in medium temperature $T_g$ during excitation, estimated by neglecting density fluctuations, viz.

$$\Delta T_g \approx \frac{8 \, E_L}{3\pi(n_g k_B \eta D^2 L)}, \tag{12}$$

where $n_g$ is gas number density (cm$^{-3}$), $k_B$ is Boltzmann's constant and $\eta$ is medium excitation efficiency (Table 2). For the present system this is $\Delta T_g \approx 92°$ K. over 33 excitations or $\Delta T_g \approx 2.8°$ K. per excitation. Thus $\Delta T/T_g$ is $\sim 10^{-2}$ per excitation. If the system is to achieve $(\Delta\rho/\rho_o) \sim 10^{-3} (\rho_s/\rho_o)$, a random excitation uniformity variation per excitation of no more than 10% and operation at atmospheric or lower pressures, will be required. The restriction on cumulative or coherent nonuniformities is more severe.

Shock-like disturbances, launched from e-beam foils and other boundaries, can also seriously degrade medium quality. Where such disturbances occur, elimination of their effect by increasing system volume will reduce the excitation efficiency of the system. For a two-sided irradiation, the shock that comes off the foil during multiple excitation travels a distance $$x_s = M_s a_o \tau_l \eta \tag{13}$$

during the pulse build-up cycle, where $M_s$ is the shock Mach number and $a_o$ is local sound speed. If the excitation volume is increased to accommodate this disturbance and maintain disturbance-free operation during excitation in the region traversed by the pulses, then the excitation efficiency will decrease according to $$\eta = 1 - (2 M_s a_o \tau_l \eta)/D \tag{14}$$

Figure 7:
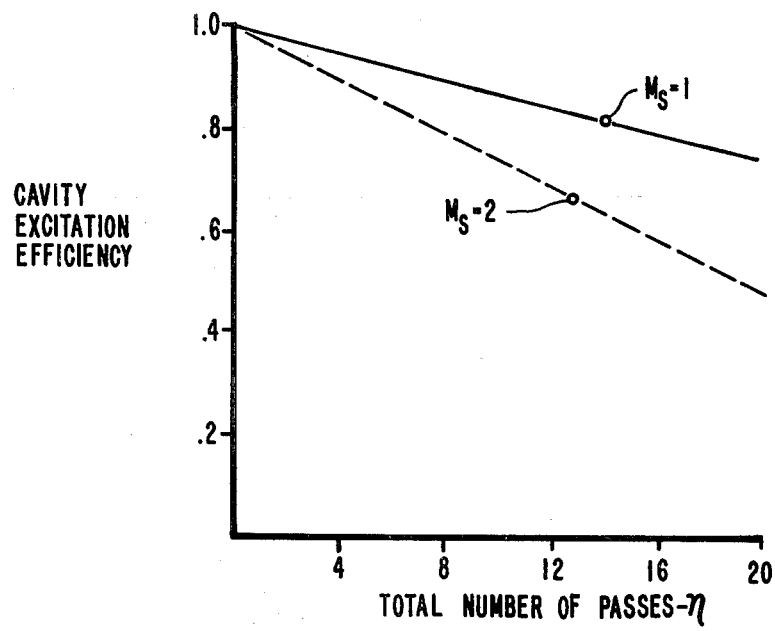
FIG. 7 is a graphic illustration of the dependence of cavity excitation efficiency of a MERA amplifier, due to compensation for a disturbance generated at the electron beam foil, as a function of the total number of passes through the amplifier.

Efficiency $\eta$ is shown in FIG. 7 as a function of the number of passes $\eta$ for different shock Mach numbers. This plot should be compared with a similar efficiency plot, FIG. 3, for different cavity losses. Although this is a potentially serious problem, there is not technological reason why it cannot be greatly suppressed or eliminated by amplifier design.

Following each multiple excitation sequence, the acoustic disturbances will propagate through the system and be convected with the gas flow. The magnitude of the acoustic damping problem for the large scale MERA amplifiers is easily evaluated. With $\tau_{RC}$ equal to reactor cycle time and neglecting gas flow effects, an initial density disturbance will bounce back and forth $n = a_o \tau_{RC}/D$ times in the cavity and diminish in amplitude by viscous and thermal conduction damping, $s$, and by reflection (R<1), reaching a final amplitude $$\Delta \rho_f / \Delta \rho_i \approx R^n e^{-n \alpha_s D} \quad (n = 1,2,3,\dots) \tag{15}$$

prior to the next excitation. For the 60 Hz system described above, $n \sim 8$ and $\alpha_s D \sim 0.10/\lambda_s^2$ (cm) where $\lambda_s$ is the sound wavelength or characteristic dimension of the density disturbance. For $\lambda_s \gtrsim 1$ cm disturbances the damping is small and attenuation by reflection is essential. In this situation, $\Delta \rho_f/\Delta \rho_i \sim R^8$; thus, to achieve $\Delta \rho_f/\Delta \rho_i \sim 10^{-4}$ requires $R \sim 0.3$. The combined application of boundary damping and convection will be required to eliminate disturbances. This points up another advantage of the use of Helium: high acoustic velocity, which facilitates boundary damping.

Power conditioning can be one of the major concerns in the development of efficient lasers for fusion applications. The power conditioning system provides the conversion of energy from the primary source to the laser cavity. In power plant designs, the laser system must interface with the power output grid and convert this energy source to one appropriate for laser excitation. The magnitude of the re-circulating power is a major design factor, and the efficiency and reliability of the power conditioning system will strongly influence system performance. Similar design constraints will be extant for single pulse systems as the energies become larger. Current energy storage and transfer systems based on capacitors as an intermediate energy source become less cost effective as the magnitude of the energy stored and the power levels of transfer increase.

The process of power conditioning can be considered as the transfer of discrete amounts of energy in shorter and shorter times. The difficulties in control increase with the amount of energy transfer at each step. In the MERA concept, the shortest time is the nominal 30 nsec required for a single amplifier pass. The energy deposited in a single pulse, however, is only a fraction of the total energy used in the amplification process. Each pass, which occurs nominally in 30 nsec,. contributes a fraction of the overall energy to the optical beam. This reduces the requirements on the final energy storage system as the system can be recharged between pulses. This relaxation of constraints allows new options for the power conditioning system. For example, a design using hot cathode guns and oil storage lines has been developed in the context of the MERA application and is the subject of a co-pending U.S. Patent application Ser. No. 868,638 by L. G. Schlitt, filed simultaneously with this application and assigned to the same assignee and incorporated by reference herein. The Schlitt invention "stacks" and circulates voltage pulses on a transmission line and produces repetitive current pulses of duration $\Delta t \gtrsim 25$ nsec and a repetition rate of $r \lesssim 10^5$ sec$^{-1}$.

Figure 8:
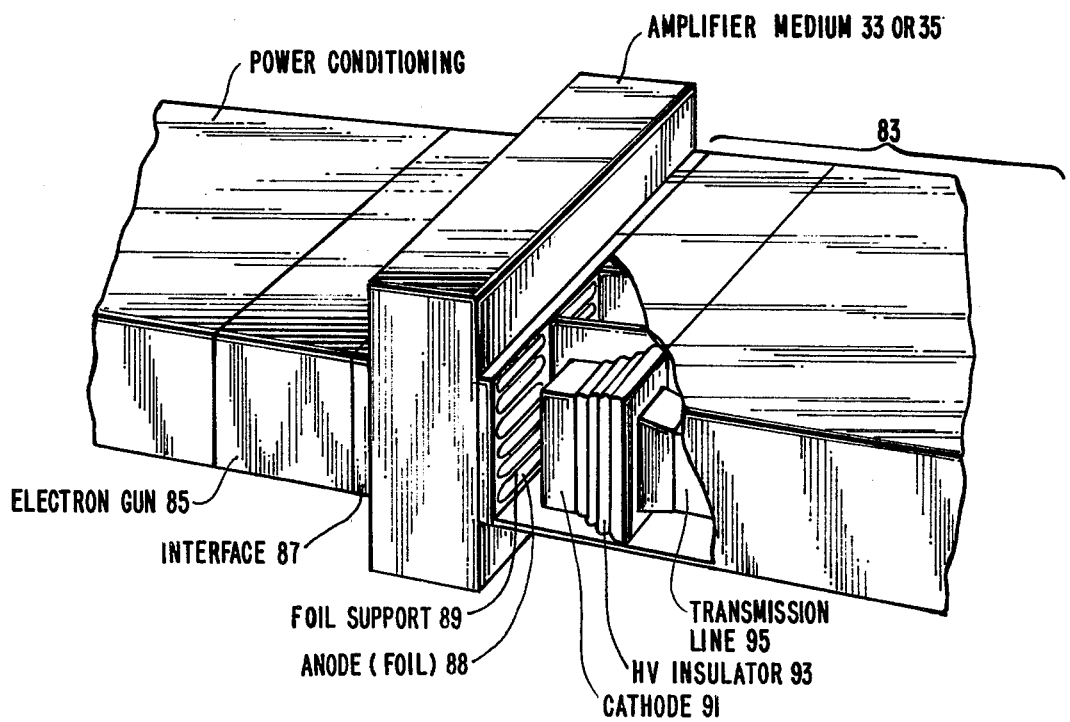
FIG. 8 shows a cutaway view of one side of an electron beam device, which may be used to repetitively pump the amplifier medium in a MERA system.
Figure 9:
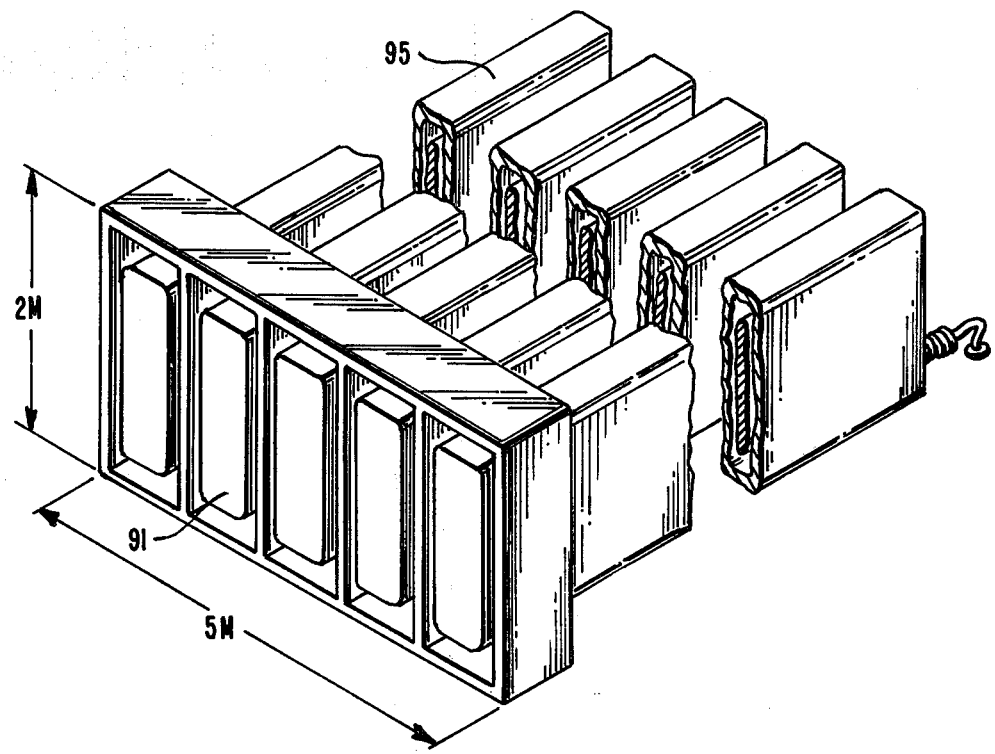
FIG. 9 is a view of several of the transmission line-cathode modules which comprise part of the electron beam pump means for the amplifier medium.

The electron beam and power conditioning system are shown schematically in FIGS. 8 and 9 and require a power supply, an energy storage and conditioning module 83, an electron gun 85 and an interface 87 with the gain medium of the amplifier (33 or 35) on each side, for a two-sided system. Located on each side of the gain medium are, an anode (foil) 88, a foil support 89, and a cathode 91 for (each) electron gun, a high voltage insulator 93 and a transmission line 95. One such electron beam system is described fully in the co-pending U.S. Patent application Ser. No. 868,638 by Schlitt supra.

The primary energy storage consists of a "quasi-dc" charged oil dielectric transmission line. Switching and electron beam formation are accomplished in a thermionic tube with an active grid. The system may be modularized as in FIG. 9, to facilitate maintenance and minimize failure induced damage. The power conditioning system is capable of moderate pulse repetition frequencies, and in fact must be repetitively pulsed to minimize the impact of continuous cathode power dissipation.

The laser medium determines most required gun properties. Voltage must be matched to the medium stopping power, the size is set by the required output energy, and the geometry must provide efficient beam energy deposition. Current density is determined by the required pumping rate, and the pulse length is limited by the inversion lifetime of the gain medium.

The electron gun technology is old and well understood but for the use here it could present a critical design problem. Pulsed high current extraction is required, but grid current collection must be minimized to keep modulator characteristics reasonable. High voltage standoff must be provided for the transmission line insulator, and grid emission must be prevented in high electric fields. The tube must have the proper impedance characteristics. It must also have low inductance (preferably continuously matched) to permit short pulses, but must reflect pulses when the tube is off.

The primary energy storage utilizes pulse stacking to minimize size and cost. Dispersion places an upper limit on the interpulse spacing, but this limit can be circumvented by increasing the size of the store or by state-ofthe-art pulse charging from a capacitor bank between pulses.

The parameters for a particular design for electron beam power conditioning, applicable to the present XeF* MERA system, are presented in Table 4. Foil losses require an electron energy ≳0.25 MeV. This prevents the use of Helium, except at higher pressures. Use of a reduced pressure requires reduction of electron energy or use of a higher Z gas such as Argon, which results in greater backscatter (12% for Ar vs. 5% for Ne).

TABLE 4
Electron Beam Power Conditioning

| | |
|---|---|
| energy input per amplifier | 300 kJ |
| pulse length | 30–100 ns |
| pulse spacing | 3–13.3 μm |
| number of consecutive pulses | 2–20 |
| electron energy | 0.75 MeV |
| geometry | 2-sided, planar |
| amplifier size | 2 × 2 × 5 M |
| beam area | 10 $M^2$ |
| current density | 1.5 amps/$cm^2$ |
| medium | .95 Ne + .05 Xe |
| pressure | 2 atm |
| beam profile | uniform |
| foil thickness | 13 μm (Nickel) |

In addition to amplifiers which utilize electron beam and electric discharge excitation of rare gas-halogen mixtures, photon pumping of gases and solids is also attractive. For instance, photolytic pumping of iodine compounds, such as $CF_3I$, $C_2F_5I$ and $C_3F_7I$, with a KrF* laser is possible, operating at a wavelength of 1.31 μm. Another attractive possibility is photolytic pumping of the group VI compounds, such as $CO_2$, $N_2O$, $O_2$, OCS, and OCSe, with rare gas excimer lasers such as $AR_2^*$, $Kr_2^*$ and $Xe_2^*$. The laser media emit radiation in the visible region at $\lambda \approx 0.55$ μm. Details on these photolytic pumping schemes are discussed at length in U.S. Pat. No. 4,087,763, issued May 2, 1978, to E. V. George et al, assigned to.

Another preferred embodiment of the invention uses a gas-solid hybrid amplifier system, for the following reasons. Implementation of economic laser fusion applications requires laser systems delivering nanosecond long pulses with peak powers in excess of 100 TW and at pulse repetition rates greater than one Hz. Identification and development of fluorine-based solid state host materials (characterized by relatively low nonlinear indices of refraction) allow the possibility of building Nd:glass lasers meeting application requirements with respect to peak power. This development notwithstanding, conventionally designed Nd:glass lasers utilizing these new materials will fail to meet the rigorous average power and efficiency requirements for two reasons: (1) low coupling efficiency of Xenon flashlamp radiation to the active centers (Nd ions) and (2) a substantial conversion of absorbed pump energy into thermal energy in the glass via electron-phonon processes. Coupled with the relatively low thermal conductivity of these dielectric materials, this internal energy inefficiency leads to unacceptable levels of beam distortion in the high pulse repetition mode of operation. The dominance of non-radiative over radiative processes in 1.06 μm Neodymium glass lasers occurs because of the specific energy level structure of the $Nd^{3+}$ ion and the use of the broadband Xenon flashlamps to pump the laser. Since one is not constrained to utilize either broadband flashlamps or the energy levels of the $Nd^{3+}$ ion producing 1.06 μm radiation, high average power, rare-earth solid-state lasers may be fabricated and used.

Figure 10:
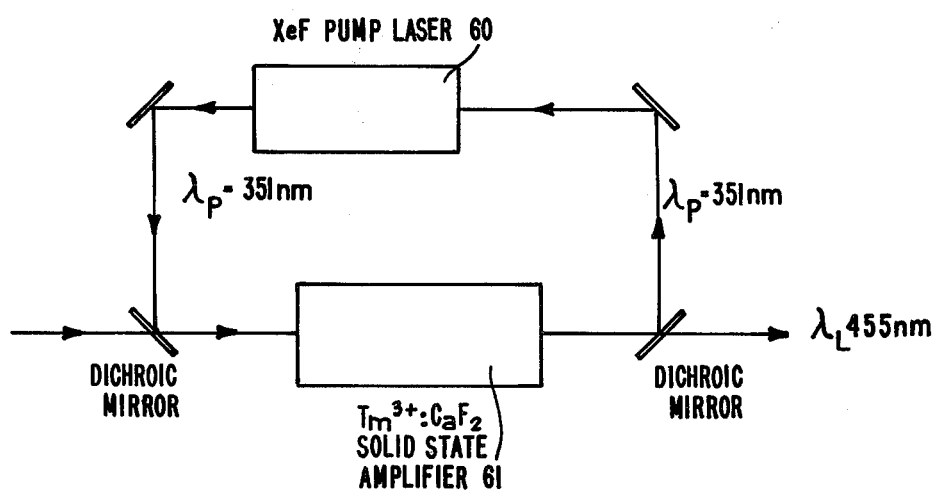
FIG. 10 is a schematic layout of a hybrid laser system in which the output from a XeF pump laser is used to drive a $Tm^{3+}$:$CaF_2$ solid state amplifier for use in a MERA system.

Recently, several efficient (≲10%), ultraviolet and visible lasers (rare gas excimers, metal excimers, rare gas halogen excimers, and metal halogen excimers) which do not store appreciable energy have been discovered and developed. These systems offer the possibility for the development of fluorine based, rare-earth doped, solid state laser media coherently pumped by long pulse ultra-violet and visible lasers. This approach is the subject of a co-pending U.S. Patent application Ser. No. 868,633, by John L. Emmett et al, filed simultaneously with this application and assigned to the same assignee and incorporated by reference herein. An example of such a system, which uses a long pulse XeF laser 60 to pump a $Tm^{3+}$: $CaF_2$ amplifier 61, is illustrated in FIG. 10. The flexibility of temporally and spatially tailored coherent pumping offers new options for the design of power limited pulsed lasers. The dominance of radiative over non-radiative relaxation processes in these media lead to very little thermal energy transfer to the solid state matrix, and may provide a means for achieving high average power and overall laser efficiency. Other particular examples of the amplifier in this embodiment are: (1) use of an XeF* laser to pump a $Ce^{3+}$:YAG solid laser; (2) use of an $Xe_2^*$ or $Ar_2^*$ laser to pump a $Pr^{3+}$:$LaF_3$ solid laser; (3) use of XeF* to pump a $Eu^{2+}$:$CaF_2$ solid laser; and (4) use of XeF* or KrF* to pump a $Yb^{2+}$:$CaF_2$ solid laser.

Efficient (≲10%) long pulse UV and visible pump laser systems of sufficient beam quality can be developed. Implementation of a hybrid laser system requires a design which minimizes the linear and non-linear phase and amplitude propagation distortions inherent to solid state laser media and also maximizes the pump conversion efficiency. The linear stress and thermally-induced distortions set limits on high average power design. For instance, the phase distortion $\Delta\phi_\perp$, across the beam due to a corresponding temperature variation $\Delta T_\perp$, neglecting mechanical and thermally-induced stresses, is:

$$\frac{\Delta\phi_\perp}{2\pi} \approx n\frac{L}{\lambda}\left\{\frac{1}{n}\frac{\partial n}{\partial T} + \frac{\partial L}{\partial T}\right\}\Delta T_\perp \tag{16}$$

where L is the length of path traversed. For most solid state media $(1/n)\partial n/\partial T$ and $(1/L)\partial L/\partial T$ are $\sim 10^{-6}$–$10^{-5}$/°C. As an example, for $CaF_2$ at $\lambda=315$ nm Eq. (16) may be written simply $$\Delta\phi/2\pi \approx 0.6 \text{ L(cm) } \Delta T_\perp(°C), \tag{16'}$$

which imposes stringent constraints on thermal uniformity, reflected in pump beam uniformity, gas flow cooling requirements, and overall thermal environment control. The nonlinear distortion is due primarily to intensity-induced, self-focusing phenomena which limits the peak power achievable in a single pulse. The accumulated nonlinear phase distortion is the well-known B integral, viz $$\phi_{NL} = B = k\gamma \int_0^L I\,dx, \tag{17}$$

where $k = 2\pi/\lambda$ and the nonlinear index contribution is $n_2 = vI$. If a $CaF_2$ matrix is used, $v$ is $\approx 1.7 \times 10^{-16}$ cm$^2$/W.

Parasitic oscillation and fluorescent amplification can depress overall system efficiency. In practice, parasitic oscillation is a more serious problem than superfluorescence and limits the small signal gain-beam diameter or amplifier length product to be $\alpha D < n$ where $n \sim 3-5$. The restriction on beam diameter can be removed by using a mosaic structure with index matching to a suitable absorbing medium positioned between individual amplifier elements, as shown in co-pending U.S. Patent application Ser. No. 868,644 by John L. Emmett, filed simultaneously with this application, assigned to the same assignee and incorporated by reference herein. The index matched absorbing medium acts to suppress parasitic laser amplifier emissions that would otherwise propagate in a non-longitudinal direction so as to deplete the amplifier inversion density, without seriously affecting longitudinal amplification of laser radiation. Cascaded laser systems, as compared to regenerative systems, place the minimum constraints on medium quality since each element is traversed only once by the amplifying laser pulse. However, these systems are much less cost effective and therefore consideration of regenerative techniques is justified.

The propagation and extraction considerations presented for XeF* above have been used in a preliminary design study of the XeF* laser 60 pumping a $Tm^{3+}$ (0.1% mole):$CaF_2$ hybrid system shown in FIG. 10. The results for two different regenerative amplifier designs, with different assumptions concerning the saturation characteristics of the solid state medium, are presented in Table 5. In each case, two possible system clear apertures are considered: a kilojoule class 20 cm diameter system and a 100 kilojoule class 200 cm diameter system. The 200 cm diameter system employs a disc having a mosaic structure composed of a number of 20 cm diameter elements for parasitic suppression. The disks are given to be circular, anti-reflection-coated and oriented normal to the direction of propagation of the laser light. The B integral and thermal phase distortions were calculated using Eqs. (16') and (17). The maximum thermal phase distortion is estimated by assuming that the temperature variation across the disk equals the temperature rise, 8 or $16 \times 10^{-3}$° C., in the medium due to the laser energy deposition. Since this distortion probably develops over a time scale much longer than the laser excitation and extraction time, induced thermal effects are not expected to affect single pulse operation. However, from Eq. (16'), it is clear that the thermal environment of the disks prior to excitation must be very stable. Based on the B integral values presented in Table 5, this system will probably not require spatial filtering. The representative point designs presented in Table 5 are enclorgaging evidence of what is possible with single-pulse, power-limited, solid-state hybrid laser systems. Owing to the low disc temperature rise per pulse, one also expects that gas cooling techniques will allow operation of solid-state hybrid lasers on an average power basis.

TABLE 5

Summary of the Design Characteristics for an XeF Laser Pumped $Tm^{3+}$(0.1% mole): $CaF_2$ Disk Amplifier

| | |
|---|---|
| Gain Cross Section $\sigma_s$(cm$^2$) - $\sim 10^{-19}$ | Amplifier Diameter D(cm). - 20* or 200** |
| Radiative Lifetime $\tau_L(\mu s)$ - 20 | Number of Disks - 5 |
| Photon Wavelength $\lambda$(Å) - 4550 | Disk Thickness (cm) - 4 |
| Pump Fluence $\Gamma_p$(J/cm$^2$) - 8.8, 17.6 | Amplifier Medium Length/Pass L(cm) - 20 |
| Saturation Fluence $\Gamma_s$(J/cm$^2$) - 2.2, 4.4 | Number of Passes $\eta$- 5 |
| Input Energy $E_I$(J) - 0.01, 1.0 | Excitation Pulse Time $\tau_p$(ns) - 200 |
| Output Energy $E_o$(kJ) - 1.6*, 2.7*, 160**, 270** | Transit Time $\tau_L(\mu s)$ - 3 |
| Output Fluence $\Gamma_o$(J/cm$^2$) - 4.6, 8.7 | Total B. Integral (rad.)- 1.9, 3.4 |
| Gain-Length Product $\alpha$L - 4 | Disk Temperature Rise/Pulse (m°C.)- 8, 16 |
| Inversion Density (cm$^{-3}$) - 2 × 10$^{18}$ | Max. Thermal Phase Distortion (waves) - 0.5, 1.0 |

*20 cm aperture
**200 cm aperture, 20 cm mosaic element aperture
***Assume $\Delta T \sim 8$, 16 m°C.

Another embodiment of the invention, the beam switch mode, does not require that the target be accelerated into the path of the beam. Referring more particularly to FIG. 11, optical switches 71 and 73 are positioned in the main beam path to simultaneously deflect each counter-propagating pulse out of said main path and cavity to be perpendicularly redirected by fully reflecting mirrors 75 and 77 to an externally positioned target chamber 39 containing the target 41. In the inactivated state, each optical switch 71 and 73 passes the laser pulses through undeviated in direction, or deviated by a fixed and controlled amount. With the optical switch activated, the laser pulse is now deflected in direction by a (new) fixed amount so as to pass through focusing lenses such as 37 and 38 and thus initiate laser implosion at the target. The optical switches are activated between the (N−1)$^{th}$ and N$^{th}$ pass of a laser pulse through the laser amplifier(s), after the pulse has reached saturation intensity.

In this embodiment, one may use a single amplifier, as shown in FIG. 11, or more than one such amplifier; one advantage of the use of a single amplifier being lower capital and electric cost. A second advantage is that the gain media excitation need only be synchronized to the (preferably simultaneous) passage of one or two or more counter-propagation pulses. In practice, this may require that the single amplifier be positioned symmetrically in the beam path, for example as shown in FIG. 11.

The optical switch 71 and/or 73 may be any of a large variety known in the prior art. See, for example, the survey of beam deflection techniques in V. J. Fowler and J. Schlafer, 54 Proc. I.E.E.E. pp 1437–44 (1966). More particularly, one may use the well-known deflection of polarized light which is incident on a multilayer dielectric-coated polarization splitter.

The multiple excitation regenerative amplifier may be used to produce high energy laser pulses to find ranges, heat materials, join materials, implode laser fusion targets, and the like.

Although the preferred embodiments of the present invention shown and described herein have been directed in use in an inertial confinement system, it will be apparent that modification and variation may be made without departing from what is regarded as the subject matter of the invention.

We claim:

1. Apparatus for producing a high energy laser pulse, the apparatus comprising:
    a large aperture light amplifier containing a regenerative medium;
    an optical cavity including at least two light reflective means containing the amplifier therebetween;
    laser means for producing a laser pulse to be amplified;
    pulse injection means for introducing the laser pulse between two light reflective means of the optical cavity so as to permit the laser pulse to propagate as a beam from one light reflective means to the other;
    pump means for repeatedly and transistorily exciting the amplifier medium so as to amplify the laser pulse as it passes through the amplifier medium, with the amplifier medium being excited at least once for each passage of the laser pulse therethrough; and
    optical switch means to controllably remove the laser pulse from the optical cavity, positioned in the path of the laser pulse, to allow the pulse to pass through undeviated in direction when the optical switch means is in its unactivated state, and to cause the pulse to deviate in direction when the optical switch means is in its activated state.

2. Apparatus according to claim 1, wherein said regenerative medium of said light amplifier is an excimer gas selected from the group consisting of XeF*, KrF*, ArF*, Ar$_2$*, Xe$_2$*, or Kr$_2$*.

3. Apparatus according to claim 2, wherein said pump means is an electron beam which may be repetitively pulsed at intervals of substantially at least one microsecond.

4. Apparatus according to claim 1, wherein said regenerative medium of said light amplifier is an excimer gas selected from the group consisting of CF$_3$I, C$_2$F$_5$I and C$_3$F$_7$I.

5. Apparatus according to claim 1, wherein said regenerative medium of said light amplifier is selected from the group consisting of CO$_2$, N$_2$O, O$_2$, HgCl and HBr.

6. Apparatus according to claim 1, wherein said regenerative medium of said light amplifier is a solid matrix, selected from the group of SiO$_2$, CaF$_2$, LaF$_3$ and YAG, doped with a rare earth ion, selected from the group) of Nd$^{3+}$, Er$^{3+}$, Tm$^{3+}$, Eu$^{2+}$, Pr$^{3+}$, and Yb$^{2+}$.

7. Apparatus according to claim 6 wherein said pump means is a gas laser which is driven by a repetitively pulsed source electron beam apparatus.

8. Apparatus according to claim 1, wherein said pulse injection means includes at least one beam splitter to divide the laser pulse into at least two synchronized counter-propagating pulses which propagate between said light reflective means of the optical cavity.

9. Apparatus according to claim 1, wherein said pump means includes an excitable gas and an excitation source capable of repetitively exciting the excitable gas, said light amplifier is a solid state matrix, doped with a rare earth ion that is capable of response to excitation by the excitation source, the radiative lifetime of the excitable gas in an excited state is substantially less than 10 microseconds, and the radiative lifetime of an excited state of the rare earth-dopant in the solid state matrix is substantially greater than 10 microseconds.

10. A method for production of high energy laser pulses, the method comprising the steps of:
    forming a laser pulse of appropriate wavelength;
    injecting the laser pulse into an optical cavity;
    propagating the laser pulse to one end of the cavity and reflecting the pulse thereat;
    repeating the propagation and reflection step at least once;
    passing the pulse through a repetitively pumped regenerative amplifier at least once for each cavity round trip transit of the pulse;
    exciting the regenerative amplifier prior to each passage of the pulse therethrough; and
    deflecting the beam of laser light out of the optical cavity.

11. A method according to claim 10, further including the step of providing a repetitively pulsed electron beam to pump said regenerative amplifier at time intervals of a frequency at least once per microsecond.

* * * * *